(12) United States Patent
Catchpole et al.

(10) Patent No.: US 8,383,845 B2
(45) Date of Patent: Feb. 26, 2013

(54) EXTRACTION OF HIGHLY UNSATURATED LIPIDS WITH LIQUID DIMETHYL ETHER

(75) Inventors: Owen John Catchpole, Wellington (NZ); John Bertram Grey, Wellington (NZ); Andrew Douglas MacKenzie, Wellington (NZ); Stephen John Tallon, Lower Hutt (NZ)

(73) Assignee: Industrial Research Limited, Lower Hutt (NZ)

( * ) Notice: Subject to any disclaimer, the term of this patent is extended or adjusted under 35 U.S.C. 154(b) by 155 days.

(21) Appl. No.: 12/301,729

(22) PCT Filed: May 24, 2007

(86) PCT No.: PCT/NZ2007/000122
§ 371 (c)(1),
(2), (4) Date: Sep. 18, 2009

(87) PCT Pub. No.: WO2007/136281
PCT Pub. Date: Nov. 29, 2007

(65) Prior Publication Data
US 2010/0160659 A1    Jun. 24, 2010

(30) Foreign Application Priority Data

May 24, 2006  (NZ) ........................................ 547429

(51) Int. Cl.
*C11B 1/00*    (2006.01)
(52) U.S. Cl. ........................................ 554/20
(58) Field of Classification Search ........... 554/20
See application file for complete search history.

(56) References Cited

U.S. PATENT DOCUMENTS

| | | | | |
|---|---|---|---|---|
| 4,069,351 A * | 1/1978 | Yano et al. | ..... | 426/650 |
| 4,157,404 A | 6/1979 | Yano et al. | ..... | 426/429 |
| 4,234,619 A | 11/1980 | Yano et al. | ..... | 426/614 |
| 4,367,178 A | 1/1983 | Heigel et al. | ..... | 260/403 |
| 5,962,711 A * | 10/1999 | Harrod et al. | ..... | 554/145 |
| 6,083,536 A | 7/2000 | Macrides et al. | ..... | 424/547 |
| 6,211,390 B1 | 4/2001 | Peter et al. | ..... | 554/170 |
| 7,329,789 B1 * | 2/2008 | Schonemann et al. | ..... | 585/351 |
| 7,696,396 B2 | 4/2010 | Schonemann et al. | | |
| 7,868,195 B2 | 1/2011 | Fleischer et al. | | |
| 2011/0196163 A1 | 8/2011 | Fleischer et al. | | |

FOREIGN PATENT DOCUMENTS

| | | |
|---|---|---|
| CA | 1115291 | 12/1981 |
| CA | 2288469 | 5/2000 |
| GB | 1347727 | 2/1974 |
| GB | 1 458 628 | 12/1976 |
| JP | 53-12898 A | 2/1978 |
| JP | 2001-72693 A | 3/2001 |
| JP | 2001-106636 A | 4/2001 |
| NZ | 535894 | 10/2004 |
| NZ | 535920 | 10/2004 |
| WO | 01/76385 A1 | 10/2001 |
| WO | 01/76715 A2 | 10/2001 |
| WO | 02/092540 | 11/2002 |
| WO | 2004/066744 | 8/2004 |
| WO | 2005059184 A2 | 6/2005 |
| WO | WO 2005059184 A2 * | 6/2005 |
| WO | 2005/072477 | 8/2005 |
| WO | 2006/041316 A1 | 4/2006 |

OTHER PUBLICATIONS

Arntfield et al., "Supercritical $CO_2$ Extraction of Egg Yolk: Impact of Temperature and Entrainer on Residual Protein," *JAOCS* 69 (8):823-825, 1992.

Schreiner et al., "Positional Distribution of Fatty Acids in Egg Yolk Lipids," *Journal of Food Lipids* 13:36-56, 2006.

Teberikler et al., "Selective Extraction of Phosphatidylcholine from Lecithin by Supercritical Carbon Dioxide/Ethanol Mixture," *JAOCS* 78(2):115-120, 2001.

\* cited by examiner

*Primary Examiner* — Deborah D Carr
(74) *Attorney, Agent, or Firm* — Seed IP Law Group PLLC

(57) ABSTRACT

A process for obtaining lipids containing highly unsaturated fatty acids from plant or animal material, including contacting the material with liquid dimethyl ether to give a dimethyl ether solution containing lipids and a residue of plant or animal material, separating the solution from the residue of plant or animal material, and recovering lipids from the solution.

24 Claims, No Drawings

EXTRACTION OF HIGHLY UNSATURATED LIPIDS WITH LIQUID DIMETHYL ETHER

TECHNICAL FIELD

This invention relates to separation technology. In particular, the invention relates to the extraction of materials, such as dried or partially dried plants or seeds (including marine or terrestrial species), or animal products (including marine or terrestrial species), with liquid dimethyl ether (DME), and optionally also with near-critical carbon dioxide, to obtain an extract rich in highly unsaturated lipids, especially highly unsaturated complex lipids, and optionally, a residue that is useful as a nutraceutical or for extracting water soluble enzymes and/or proteins.

BACKGROUND

Highly unsaturated lipids (lipids having 3 or more sites of unsaturation, and 18 or more carbons in the fatty acid chain) have a variety of metabolic roles within the human body. They are essential in the development of the brain and eyesight for infants, and may also be beneficial for cardiovascular health, mental health, and immune and inflammatory conditions. The biological properties of these lipids are usually dependent on the type of fatty acids that are present, and those containing highly unsaturated fatty acids are the most bioactive. In general, these highly unsaturated fatty acids are only found in significant quantities in complex lipids of terrestrial plants and animals, but may also appear in both neutral and complex lipids of marine animals.

Phospholipids are a subset of complex lipids. They are essential components of all mammalian cell membranes, and play an important role in maintaining the fluidity of the cell membrane, and passage of molecules through the membrane. The highly unsaturated arachidonic acid (C20:4 w-6) is absent from, or present in very low concentrations in, secondary products derived from animals, such as phospholipids from non-human milk. Arachidonic acid is vital for the development of infants, and so infant formula made from non-human milk is supplemented with this fatty acid. There is a need, therefore, to obtain sources of this fatty acid for this purpose. The complex lipids of many animal tissues, especially organs and glands, are rich in arachidonic acid, as are eggs.

Mosses and ferns are also known to contain high levels of arachidonic acid in complex lipid form. It is therefore desirable to find an extraction technology which can recover this highly unsaturated fatty acid (HUFA) in a complex lipid form, especially since the complex lipid form of the fatty acid gives protection against oxidation.

Marine organisms (micro and macro algae, fish flesh, eggs and livers, molluscs, invertebrates) are rich sources of the HUFAs eicosapentaenoic (C20:5 w-3) and docosahexaenoic acid (C20:6 w-3) in neutral and/or complex lipid form. These fatty acids are also required for infant formula supplementation, and for use in controlling neurological disorders, cardiovascular disease, inflammation, and lipid content in the blood. It is also desirable to find an extraction technology which can recover these polyunsaturated fatty acids.

Similarly, seeds from certain plants, especially those from pinus and podocarp trees, contain complex lipids rich in non-methylene interrupted polyunsaturated fatty acids (C20:3 and C20:4). Non-methylene interrupted fatty acids are used for controlling satiety and as possible anti-inflammatory agents. There is a need therefore to find an extraction technology which can recover these polyunsaturated fatty acids.

The extraction of neutral lipids using supercritical $CO_2$ is well known, especially in the extraction of seed oils. A disadvantage of these processes in general is that large high pressure vessels (typically 300 bar or higher pressure is used) are required to contain the raw material, which makes the production plant very expensive. High flow rates and long extraction times are also required, as the oils have very low solubility in supercritical $CO_2$ (typically 1 g of oil per 100 g of solvent). There are fewer publications concerning the extraction of lipids from marine species. U.S. Pat. No. 6,083,536 describes a process for the extraction of non-polar lipids from crude freeze-dried mussel powder to give a non-polar lipid fraction useful for the treatment of inflammatory conditions. Fresh mussel is stabilised with tartaric acid prior to freeze-drying and $CO_2$ extraction. No compositional data of the extract is given, and no complex lipids are extracted, as they are insoluble in $CO_2$.

U.S. Pat. No. 4,367,178 describes a process for purifying crude soy lecithin by using supercritical $CO_2$ to extract neutral lipids and leave behind insoluble phospholipids, thereby concentrating the phospholipids in the lecithin. The crude lecithin had been produced by conventional degumming of soy oil. The use of co-solvents such as ethanol to increase the solvent power of supercritical $CO_2$ has been proposed to overcome the limitations of $CO_2$.

EP 1,004,245 A2 describes a process in which dried egg is first extracted with supercritical $CO_2$ to remove neutral lipids, and is then either extracted with supercritical $CO_2$ and an organic co-solvent (ethanol) that is a liquid at room temperature or the organic solvent (without $CO_2$) to extract the phospholipids. Both options have the disadvantage of incomplete phospholipid extraction. In addition, both leave solvent residues in the defatted egg powder, which results in denaturation of protein. The neutral egg lipids obtained by supercritical $CO_2$ extraction have negligible levels of highly unsaturated fatty acids, as shown in example 3.

Arntfield et al. (JAOCS, 69, 1992, 823-825) show that egg protein is substantially denatured after extraction with $CO_2$ and methanol as a co-solvent. The use of ethanol with supercritical $CO_2$ results in incomplete extraction of phospholipids. Phosphatidyl choline is the most readily extracted phospholipid, but all other phospholipids have very low or no solubility and are not extracted (Teberliker et al., JAOCS, 78, 2002, 115-119). Schriener et al. (Journal of Food Lipids, 13, 2006, 36-56) show that the majority of highly unsaturated fatty acids in egg yolk lipids are in phosphatidyl ethanolamine, which is not extracted in this process.

PCT publication WO 02/092540 discloses medicinal uses of polar lipids containing HUFAs, and blends of polar lipids with other oils. The extraction method is disclosed as using alcohol and centrifugation, but no further details are given. It is also disclosed that the polar lipid-rich fraction could be obtained as a by-product of edible seed oil extraction by the industrial process of degumming.

A process for the extraction of phospholipids containing HUFA from wet phospholipid-containing material is described in PCT publication WO 2005/072477. An aliphatic alcohol, and in particular, isopropanol and/or n-propanol, is used. The material containing phospholipids is contacted with a water soluble aliphatic alcohol at a temperature sufficiently high that the phospholipids dissolve in the solvent, while the proteins, which become denatured, precipitate from solution.

DME has previously been used in the extraction of lipids from raw egg yolk (U.S. Pat. No. 4,157,404) and dried egg powder (U.S. Pat. No. 4,234,619). The process causes the fractionation of the lipid and protein components into separate streams. U.S. Pat. No. 4,157,404 describes the extraction of lipids from raw egg yolk (50-55% moisture content), but the proteins are denatured in the process. The described process also requires that the lipid and water mixture recovered is then dehydrated to a water content of 20% or less, which then results in phase separation of neutral-rich and complex lipid/water-rich phases. U.S. Pat. No. 4,234,619 discloses that proteins are not denatured if the egg is dry, but the phospholipids can then only be partially extracted. In the processes described, DME was used in a temperature range of −30° C. to 40° C., spray dried whole egg powder was used and only a maximum 70% yield of phospholipids was obtained. The desired product of the invention was an egg powder that contained at least 30% of its original phospholipids content, and no cholesterol. A process for the recovery and concentration of highly unsaturated fatty acids is not disclosed. Further, the separation of neutral lipids and complex lipids in the total lipid extract into separate fractions was not discovered because of the low extraction and separation temperatures used.

PCT publication WO 2004/066744 describes the extraction of lipids from an aqueous dairy stream using near critical extraction where DME is the solvent. The publication also discloses that neither supercritical $CO_2$ nor liquid DME can extract lipids in useful yields from dry whey protein concentrate (WPC) dairy powders. The process does not disclose a method for extracting HUFA polar lipids from dry animal or plant tissue. Whey proteins are not found in animal or plant tissues, and the lipids obtained do not contain highly unsaturated fatty acids.

NZ 535894 describes the extraction of lipids from spray dried dairy products containing milk fat globular membrane proteins, which is a dairy lipoprotein/lipid/lactose mixture arising from the production of skim milk powder. The proteins are associated with the cream fraction of milk, and are not found in animal or plant tissue. Attempts to extract lipids from this dairy powder stream with high lactose contents (where high lactose content means at least 30% by mass of the total powder) by extraction using liquid DME were unsuccessful, and it was necessary to reduce the lactose content prior to production of the powder. There is no disclosure of a method for extracting HUFA lipids from dry animal or plant tissue, because the lipids contain no HUFAs. The residual powder after extraction still contains around 6-8% complex lipids.

PCT publication WO 2006/058382 broadly describes a process for obtaining an extract from a range of materials using liquid DME. There is, however, no description of the extraction of HUFAs, nor the separation of complex lipids from neutral lipids. The process described is a simple conventional process which uses liquid DME. Indeed, the sole process described in any detail is a process that uses liquid DME for obtaining an extract from Jojoba seeds which do not contain HUFAs.

It is evident that the type of proteins and other complex carbohydrates present in products derived from animal and plant materials (and the method by which the material is dried) determines whether or not lipids can be successfully extracted. The proteins and complex carbohydrates that are present in plant or animal tissues differ substantially from those found in secondary products derived from animals, such as milk. It is therefore generally not possible to predict with any certainty whether extraction of lipids, and especially complex lipids containing highly unsaturated fatty acids, is possible from plant or animal tissue containing proteins and carbohydrates associated with cells and tissue using dimethyl ether.

Surprisingly, the applicant has discovered that liquid DME can be used as an efficient extractant for obtaining HUFAs from plant or animal material, and in particular that residual DME in a lipid extract consisting of neutral and complex lipids enables formation of a gum-like phase containing complex lipids which is then easily separated from the neutral lipids.

It is an object of the invention to provide a process for obtaining lipids containing highly unsaturated fatty acids, or at least to provide a useful alternative to other processes.

STATEMENTS OF INVENTION

In a first aspect the invention provides a process for obtaining lipids containing highly unsaturated fatty acids from plant or animal material, including the steps:
 (i) contacting the material with liquid dimethyl ether to give a dimethyl ether solution containing lipids and a residue of plant or animal material;
 (ii) separating the solution from the residue of plant or animal material; and
 (iii) recovering lipids from the solution.

In certain preferred embodiments of the invention, the solution formed after contact with the material in step (i) contains neutral lipids and complex lipids.

Preferably the neutral lipids are recovered from the solution together with the complex lipids. The neutral lipids are then preferably separated from the complex lipids.

The complex lipids may form a gum phase with dissolved dimethyl ether during the recovery step (iii). Preferably the gum phase containing complex lipids is separated from the solution containing neutral lipids.

Preferably the neutral lipids are separated from the complex lipids by phase separation. Centrifugation may also be used to aid separation. Heating may be used prior to centrifugation. The complex lipids are then preferably dried by vacuum drying.

The process of the invention also preferably includes treating the lipids recovered from the solution in step (iii) with supercritical $CO_2$ according to the following steps:
 (iv) contacting the lipids recovered from the solution in step (iii) with supercritical $CO_2$ to give a $CO_2$ solution containing neutral lipids and a residue of complex lipids;
 (v) separating the $CO_2$ solution containing neutral lipids from the residue of complex lipids; and
 (vi) recovering the neutral lipids from the $CO_2$ solution.

In certain embodiments of the invention, the plant or animal material to be contacted with liquid dimethyl ether in step (i) is first treated with near-critical $CO_2$ according to the following steps:
 a. contacting the material with near-critical $CO_2$ to give a $CO_2$ solution containing neutral lipids and a residue of plant or animal material;
 b. separating the $CO_2$ solution from the residue of plant or animal material; and
 c. recovering the neutral lipids from the $CO_2$ solution.

In a preferred process of the invention, the plant or animal material is dried or partially dried before use. Preferably the plant or animal material is dried to less than 30% by weight of water in the material, more preferably to not less than 5% by weight of water in the material. Preferably the plant or animal material is dried by freeze drying or by spray drying.

In certain embodiments of the invention, the plant or animal material is wet biomass that has been frozen. Typically, the frozen wet biomass is ground prior to extraction.

Preferably one or more of the complex lipids are phospholipids, gangliosides, glycolipids, cerebrosides, or sphingolipids, typically phospholipids. The phospholipids may include any one or more of phosphatidyl choline, phosphatidyl serine, phosphatidyl ethanolamine, sphingomyelin, cardiolipin, plasmalogens, alkylacylphospholipids, phosphonolipids, lysophospholipids, ceramide aminoethylphosphonate and phosphatidic acid. The glycolipids may include galactolipids, gangliosides, sulphoquinovoysldiacylglycerides, tauroglycolipds, glycosphingophospholipids, and mannosyl lipids.

Preferably the highly unsaturated fatty acids contained in the complex lipids include, but are not limited to, any one or more of arachidonic acid (AA), alpha- and gamma-linolenic acid, pinolenic acid, sciadonic acid, columbinic acid, dihomolinolenic acid, eicosatetraenoic acid, juniperonic acid, stearidonic acid, eicosapentaenoic acid (EPA), docosapentaenoic acid (DPA), and docosahexaenoic acid (DHA).

It is also preferred that the plant or animal material is obtained from any one of the group consisting of animal organs, animal glands, marine macro- and micro-algae, lipid-bearing micro-organisms cultured by fermentation, especially filamentous fungi, algae, yeast and bacteria; shellfish, fish, marine invertebrates, eggs, plant seeds, plant leaves, plant needles, fern fronds, moss and lichen.

In preferred embodiments of the invention, the liquid dimethyl ether is near-critical dimethyl ether.

In another aspect the invention provides lipids containing highly unsaturated fatty acids obtained by the process of the invention.

In a further aspect the invention provides complex lipids obtained by the process of the invention.

In another aspect the invention provides neutral lipids obtained by the process of the invention.

In yet another aspect the invention provides plant or animal material from which lipids containing highly unsaturated fatty acids have been extracted by the process of the invention.

The invention also provides the use of the plant or animal material, from which complex lipids containing highly unsaturated fatty acids have been extracted by the process of the invention, as a nutraceutical, a food supplement, or as a source of enzymes.

DETAILED DESCRIPTION

Definitions

Fatty acid means any saturated or unsaturated aliphatic carboxylic acid typically having a hydrocarbon chain of 6 or more carbon atoms. Fatty acids are classified according to the number of carbon atoms (e.g. C20), number of sites of unsaturation (e.g. C20:4), the position of the first site of unsaturation from the methyl end of the fatty acid (e.g. C20:4 w-3), and how many carbons separate the sites of unsaturation. Normally one carbon separates the sites of unsaturation, (known as "methylene interrupted"), and is signified in the shortened nomenclature only when it is conjugated (no carbons separating the sites of unsaturation), or it is separated by more than one carbon (known as "non-methylene interrupted") and the positions of the carbons from the methyl end of the fatty acid are noted (e.g. 5,11,14 C20:3). Fatty acids are constituents of both neutral and complex lipids. In neutral lipids, only fatty acids are bound to glycerol via an ester or ether bond. Fatty acids can also be present in an unbound state, and are then referred to as "free fatty acids". In complex lipids, fatty acids and other (polar) constituents are attached to glycerol.

Polyunsaturated fatty acid (PUFA) means a fatty acid having 2 or more sites of unsaturation.

Highly unsaturated fatty acid (HUFA) means a fatty acid having 3 or more sites of unsaturation, and 18 or more carbon atoms in the fatty acid chain. Examples include arachidonic acid (AA), alpha- (ALA) and gamma-linolenic acid (GLA), pinolenic acid, sciadonic acid, columbinic acid, dihomolinolenic acid, dihomopinolenic acid, juniperonic acid, stearidonic acid, eicosapentaenoic acid (EPA), docosapentaenoic acid (DPA), and docosahexaenoic acid (DHA).

Complex lipids are lipids consisting of at least three building blocks, including fatty acids (and closely related ether, amine and hydrocarbon derivatives); a polar phosphorous group (usually a phosphate ester or acid), and/or amino alcohols, and/or carbohydrates; and glycerol. Complex lipids include, but are not limited to, phospholipids, gangliosides, glycolipids, cerebrosides, and sphingolipids. Examples of phospholipids include phosphatidyl choline (PC), phosphatidyl serine (PS), phosphatidyl ethanolamine (PE), phosphatidyl inositol (PI), sphingomyelin (SM), cardiolipin (CL), plasmalogens, lysophospholipids, and phosphatidic acid.

Neutral lipids are lipids consisting of one or two building blocks, neither of which contain polar phosphorous groups or carbohydrates. The building blocks include fatty acids, glycerol, sterols, fatty alcohols, amines, carotenoids and naturally occurring hydrocarbons. Neutral lipids include, but are not limited to, fatty acids, mono-, di- and triacylglycerides, ceramides, N-acylethanolamines, sterols and sterol esters, carotenoids and carotenoid esters.

DME-hydrated complex lipid means a complex lipid that has formed a weak association with DME, analogous to a lipid hydrated with water molecules.

Critical point means the point at which the liquid and vapour state of a substance become identical.

Supercritical means the pressure-temperature region above the critical point of a substance. Above, but close to, the critical point of a substance, the substance is in a fluid state that has properties of both liquids and gases. The fluid has a density similar to a liquid, and viscosity and diffusivity similar to a gas.

Subcritical means the pressure-temperature region equal to or above the vapour pressure for a substance, but below the critical temperature. The terms "liquefied gas" and "compressed liquefied gas" can be used to describe the same region, in which the vapour pressure of the gas is at least 3 bar at the extraction temperature.

Near-critical means the pressure-temperature region close to the critical point of a substance, and thus includes both subcritical and supercritical. Near-critical includes the reduced temperature range $0.70 \leq T_r \leq 1.25$ (where $T_r$ is the temperature divided by the critical temperature, $T_c$ of the DME); and the pressure ranges $P > P_v$ (where $P_v$ is the vapour pressure) for $T < T_c$ and $P > P_c$ (where $P_c$ is the critical pressure) for $T \geq T_c$.

Nutraceutical means a product isolated or purified from foods, and generally sold in medicinal forms not usually associated with food and demonstrated to have a physiological benefit or provide protection against chronic disease.

The Invention

The invention provides a process for obtaining lipids containing highly unsaturated fatty acids from plant or animal material, including the steps:
 (i) contacting the material with liquid dimethyl ether to give a dimethyl ether solution containing lipids and a residue of plant or animal material;
 (ii) separating the solution from the residue of plant or animal material; and
 (iii) recovering lipids from the solution.

The plant or animal material may be any animal tissue or plant tissue that contains lipids having HUFAs. In particular, the process is directed to animal organs and glands, marine macro and microalgae, lipid-bearing micro-organisms cultured by fermentation, especially filamentous fungi, algae, yeast and bacteria; small marine animals (shellfish and invertebrates), eggs, and seeds of plants. The plant or animal tissue may include parts or the whole material of a plant or animal that includes cellular material, protein, lipid and carbohydrate, but does not include secondary products derived from plant or animals such as milk.

DME is a gas at normal room temperatures and pressures, but in liquid form is known to be an effective solvent for the extraction of substances from natural products. The liquid DME used in the process of the invention is typically near-critical DME. Preferably, the pressure of the liquid DME is at least equal to the vapour pressure at the temperature of the extraction, and more preferably is at least 10 bar greater than the vapour pressure. The temperature is preferably in the range 273-373 K, and more preferably in the range 313-353 K. Higher extraction temperatures give higher yields of complex lipids that are enriched in highly unsaturated fatty acids. A typical extraction temperature is approximately 333 K. A typical extraction pressure at this temperature is 40 bar, which is sufficiently above the vapour pressure of DME to ensure maximum extraction of water if the biomass is wet.

The lipids obtained by the process are generally a mixture of complex lipids having a range of associated HUFAs. The composition of the mixture will be largely dependent on the source of the plant or animal material used. If the plant or animal material also contains neutral lipids, then the neutral lipids will also be extracted in the process.

The applicant has discovered that residual DME in a lipid extract consisting of neutral and complex lipids gives rise to the formation of a gum-like phase containing complex lipids and a liquid phase containing neutral lipids, providing that the neutral lipids do not contain high concentrations (more than 5% by mass) of free fatty acids and/or partial glycerides. The gum phase is a semi-solid liquid of higher density than the liquid phase containing neutral lipids. It is postulated that DME can form a weak association with complex lipids (especially phospholipids) similar to that formed between water and phospholipids. The so-called DME-hydrated complex lipids in the gum-like phase can easily be separated from the neutral lipids.

The use of heat during the recovery of the extract, the ratio of neutral to complex lipids in the lipid mixture, and the composition of the neutral lipids are important factors for promoting the is formation of DME-hydrated complex lipids. If the total lipid mixture contains around 50-90% neutral lipids without high levels of free fatty acids and/or partial glycerides, and the lipid mixture is liquid at room temperature, the process of recovery of the extract, and subsequent degassing of DME from the extract by pressure loss and/or heating can give rise to the formation of the complex. Separation of the gum-like and liquid phases is accelerated by the use of heating and/or centrifuging. The DME-hydrated complex lipid phase thus obtained still contains some neutral lipids, but the neutral lipid phase is free from complex lipids. This discovery is particularly applicable to egg lipids, and fish head lipids.

Liquid DME can be used to extract both the neutral and complex lipids from both wet or dry biomass, giving a mixed extract after separation from the DME. When the biomass is wet, water will also be extracted, and is separated from the lipid by conventional means, such as evaporation under vacuum, membrane separation, or phase separation especially by centrifuging. There is then the option of further extraction of the mixed extract using near-critical carbon dioxide to separate and recover the neutral lipids to give an extract further enriched in complex lipids that contain HUFAs. The complex lipids are not hydrated and do not require further processing to remove water or DME.

The plant or animal material may be extracted with near-critical carbon dioxide to remove neutral lipids before the extraction with liquid DME. This order of processing steps also enables an extract enriched in complex lipids to be obtained.

Preferably the near-critical carbon dioxide pressure is at least 73.2 bar and the temperature is in the range 304.2 to 373 K (supercritical region); or the carbon dioxide pressure is greater than or equal to the vapour pressure, and the temperature is in the range 273 to 304.1 K (subcritical region). More preferably, the carbon dioxide pressure is at least 250 bar, and the temperature in the range 313 to 353 K.

A key element of certain embodiments of the invention is the drying or partial drying of the plant or animal material prior to extraction with liquid DME. Plant and animal materials typically have a water content of 60-80% by weight of the total material. Removal of at least some of that water prior to extraction has the practical advantage that for a fixed volume of the material, the yields of lipid are larger because the amount of water has been reduced. There is therefore either a reduced need for large volume processing apparatus, or a greater throughput and lipid yield for a fixed volume processing plant. However, the process is also applicable to wet biomass, which can be advantageous in avoiding drying costs, and deactivating enzymes that is can degrade lipids or result in their encapsulation within the dry biomass matrix that prevents their extraction.

The applicant has also importantly found that it is advantageous to dry the plant or animal material but not remove the water altogether. When the water content of the material to be extracted is reduced to below a level of 30% by weight of the total material, then the process of the invention can be performed without significant degradation or denaturation of enzymes and other proteins present in the material. The residue of plant or animal material following extraction may therefore be particularly useful in various applications such as nutritional supplements that are enriched in proteins and reduced in fat, for example body building products such as defatted bovine liver; as a source of enzymes such as proteases, lipases, transglutaminases. Degradation of the enzymes would limit the usefulness of the residue.

Complex lipids vary widely in their polarity, and so it is difficult to find a solvent or solvent mixture in which the majority of phospholipids present in a plant or animal tissue can be extracted. It is even more difficult to find a solvent system which does not denature the residual proteins and/or complex non-lipid molecules during the extraction process, so that the defatted residual material can be used to extract non-lipid components such as enzymes, or use the defatted residual material as a nutraceutical. Surprisingly, the applicant has found that liquid DME used at a temperature of at least 40° C. can be used to obtain high yields of all complex and neutral lipids, without denaturation of the residual defatted material when the material has been dried prior to extraction.

General Procedures

The following four non-limiting general procedures indicate how the process of the invention may be carried out.

1. DME extraction
   a. Dry the plant or animal tissue to a water content of 30% or below, the water content is chosen to ensure DME also contains water if required
   b. Grind the plant material to a particle size of 2 mm or below
   c. Contact the plant or animal material with liquid DME at specified conditions
   d. Separate the laden DME from the plant or animal material
   e. Recover the HUFA-rich lipid extract from the DME
   If the lipid extract also contains neutral lipids, the following additional steps may be carried out:
   f. Separate DME-hydrated complex lipids from neutral lipids by phase separation
   g. Remove the DME from the hydrated complex lipids
   Optionally, the residual defatted animal material may be further extracted with an aqueous solution to obtain enzymes.

2. DME extraction followed by $CO_2$ extraction
   a. Dry the plant or animal tissue to a water content of 10% or below
   b. Grind the plant material to a particle size of 2 mm or below
   c. Contact the plant or animal material with liquid DME at specified conditions
   d. Separate the laden DME from the plant or animal material
   e. Recover the HUFA-rich complex and neutral lipid extract from the DME
   f. Contact the HUFA-rich complex lipid extract with supercritical $CO_2$
   g. Separate and recover the neutral-lipid depleted HUFA-rich complex lipid from supercritical $CO_2$ and dissolved neutral lipid
   h. Recover the neutral lipid from the $CO_2$ 3. $CO_2$ extraction followed by DME extraction
   a. Dry the plant or animal tissue to a water content of 10% or below
   b. Grind the plant material to a particle size of 2 mm or below
   c. Contact the plant or animal material with supercritical $CO_2$ at specified conditions
   d. Separate the supercritical $CO_2$ from the neutral-lipid depleted plant or animal material
   e. Recover the neutral lipid from the $CO_2$
   f. Contact plant or animal material with liquid DME at specified conditions
   g. Separate the laden DME from the plant or animal material
   h. Recover the HUFA-rich complex lipid extract from the DME 4. DME extraction of wet biomass
   a. Freeze the biomass if required
   b. Grind the frozen plant or animal material to a particle size of 5 mm or below, if required
   c. Contact the plant or animal material with liquid DME at specified conditions
   d. Separate the laden DME from the plant or animal material
   e. Recover the HUFA-rich lipid extract and water from the DME
   f. Separate the water from the lipid
   If the lipid extract also contains neutral lipids, the following additional steps may be carried out:
   g. Contact the HUFA-rich lipid material with supercritical $CO_2$ at specified conditions
   h. Separate and recover the neutral-lipid depleted HUFA-rich complex lipid from supercritical $CO_2$ and dissolved neutral lipid
   i. Recover the neutral lipid from the $CO_2$.

In the above general procedures, a spray dried powder resulting from step a, for example egg yolk powder, may be used so that step b is unnecessary in general procedures 1-3.

EXAMPLES

Example 1

Extraction of Dried Beef Liver

Approximately 8 kg of whole, fresh beef liver was obtained from a local meat processing plant. The liver was stripped of cutaneous fat deposits, gristle and skin, and was then cut into large chunks. The chunks were passed through a mincing device, giving a chunky paste. 7913.5 g of minced liver was then placed on freeze-drying trays, which were then placed in a freezer until the solids were completely frozen. The trays were then placed in a freeze drier, and dried to a water content of approximately 2-5%. A solids yield of 31.9% was obtained, giving 2526.7 g of material for grinding prior to extraction. The solids from the trays were ground in a knife mill with a sieve plate with a hole size of ~1 mm. The finely ground solids were then extracted with near-critical DME at 40 bar and 313 K. 29.316 kg of near-critical DME passed continuously through the solids (2472.6 g) at a constant flow rate for 90 minutes. After passing through the solids, the DME continuously passed through a pressure reduction valve and heat exchanger, and into a separation vessel whereupon the DME was converted to a gas. Lipid was precipitated from the gas and recovered from the separation vessel. The DME was recycled back to the extraction vessel via a condenser/sub cooler heat exchanger and pump. 363.69 g of lipid were obtained at a yield of 13.96%. The lipid contained 53% phospholipids, of which 46.2% was phosphatidyl choline (PC), 10.2% was phosphatidyl inositol (PI), 2.3% was phosphatidyl serine (PS), 16.6% was phosphatidyl ethanolamine (PE), 3.9% was sphingomyelin (SM), 6.6% was cardiolipin (CL), and 8% was not identified. The overall lipid contained 4.5% arachidonic acid (AA), 7.4% docosapentaenoic acid (DPA), 2.1% eicosapentaenoic acid (EPA) and 5.9% alpha-linolenic acid (AA). The defatted liver can be used as a sports nutrition supplement.

Example 2

Extraction of Beef Heart

Approximately 8 kg of a whole, fresh beef heart was obtained from a local meat processing plant. The heart was stripped of cutaneous fat deposits and gristle, and was then cut into large chunks. The chunks were passed through a mincing device. Minced heart was then placed on freeze-drying trays, which were then placed in a freezer until the solids were completely frozen. The trays were then placed in a freeze drier, and dried to a water content of approximately 2-5% %. A solids yield of 22.7% was obtained, giving 1725.7 g of material for grinding prior to extraction. The solids from the trays were ground in a knife mill with a sieve plate with a hole size of ~1 mm. The finely ground solids were then extracted with near-critical DME at 40 bar and 313 K. 29.52 kg of near-critical DME passed continuously through the solids over a period of 90 minutes. After passing through the solids, the DME continuously passed through a pressure reduction valve and heat exchanger, and into a separation vessel whereupon the DME was converted to a gas. Lipid was precipitated from the gas and recovered from the separation vessel. The DME was recycled back to the extraction vessel via a condenser/sub cooler heat exchanger and pump. 202.71 g of lipid were obtained at a yield of 12.3%. The lipid contained 30.0% phospholipids, of which 28.3% was phosphatidyl choline (PC), 4.4% was phosphatidyl inositol (PI), 0% was phosphatidyl serine (PS), 13.7% was phosphatidyl ethanolamine (PE), 6.6% was sphingomyelin (SM), 27.9% was cardiolipin (CL), and 12.2% was not identified. The overall lipid contained 5.6% arachidonic acid (AA), 2.0% docosapentaenoic acid (DPA), 2.8% eicosapentaenoic acid (EPA) and 5.9% alpha-linolenic acid (AA).

Example 3

Extraction of Spray Dried Egg Yolk with $CO_2$ Followed by DME

This example shows that neutral lipid can be extracted first from solid raw material, before re-extraction with DME to obtain a complex lipid concentrate rich in HUFA. The example also shows that high extraction temperatures must be used to obtain high yields of complex lipids from spray dried powder. 10.67 kg of spray dried egg yolk powder was extracted with supercritical $CO_2$ at 300 bar and 313 K. 530.34 kg of supercritical $CO_2$ passed continuously through the solids, and then sequentially through two pressure reduction stages in which the pressure was first reduced to 90 bar at 313 K to recover egg oil containing only neutral lipids (4.26 kg, yield of 40.0% by mass), and then to 58 bar at 323 K to recover a minor neutral lipid fraction (0.26 kg, yield of 2.4% by mass). The neutral lipids contained less than 1% each of arachidonic and docosahexaenoic acids. 2.98 kg of the neutral-lipid depleted egg yolk powder was then extracted with 16.24 kg of liquid DME at 293 K, 40 bar for sixty minutes as per Examples 1 and 2. 283.4 g of complex lipid extract free from neutral lipids was obtained, equivalent to a yield of 6.8% by mass of the full fat egg yolk powder. The powder was re-extracted with 13.1 kg of liquid DME at 313 K for 50 minutes as above. A further 191.3 g of complex lipid extract free from neutral lipid was obtained, equivalent to an additional yield of 4.6% by mass of the full fat egg yolk powder. The total lipid yield was thus 53.8%. To obtain a high yield of complex lipid extract free from neutral lipids, it is necessary to extract the powder at a temperature of at least 313 K. The defatted egg yolk powder can be used for baking applications which are required to be low in fat.

Example 4

Extraction of Spray Dried Egg Yolk with DME

This example shows that a small amount of DME in the extract phase can be used to separate neutral lipids from complex lipids after DME extraction. 4.119 kg of spray dried egg yolk powder was extracted with liquid DME at 323 K and 40 bar. 8.517 kg of near-critical DME passed continuously through the solids. After passing through the solids, the DME continuously passed through a pressure reduction valve and heat exchanger, and into a heated separation vessel whereupon the DME was converted to a gas. Lipid was precipitated from the gas and recovered from the separation vessel through a heated valve. The DME was recycled back to the extraction vessel via a condenser/sub cooler heat exchanger and pump. The lipid that was recovered from the separation vessel (2197.86 g, yield of 53.3%) was heated to drive off most of the residual DME, and was then centrifuged to split the lipid into a neutral lipid rich phase and a DME-hydrated complex lipid rich phase. The neutral lipid-rich phase, consisting of 75.3% of the total lipids contained less than 1% by mass complex lipids and no arachidonic acid or DHA. The polar lipid rich phase, consisting of 24.7% of the total lipids contained greater than 95% polar lipids. The polar lipids had an arachidonic acid content of 5.89% and DHA content of 2.46% %.

Example 5

Extraction of Freeze-Dried Egg Yolk

This example shows that freeze-drying the egg yolk improves the availability of the lipids for extraction. Fresh eggs were purchased from a local store, and then manually separated into egg yolks and egg white. The egg white was discarded. The egg yolks were blended at room temperature and then added to round bottom vacuum flasks, frozen and then freeze-dried. 73.05 g of freeze dried egg yolk was then extracted with 598.1 g of liquid DME at 40 bar and 333 K. 47.01 g of a yellow liquid extract containing 2% arachidonic acid and 1% DHA was obtained at a yield of 64% by mass, which is the same as the theoretical total lipid yield for egg yolk powder. The residual yolk powder and non-extracted freeze-dried yolk powder water solubility was compared with spray dried egg yolk powder (both defatted and non-extracted). Both fresh and extracted spray dried egg yolk powder was insoluble in water, indicating that the spray drying process results in denaturation. The freeze-dried protein (before and after extraction) had 22% solubility in water, whilst fresh egg yolk proteins were 58% soluble. The extracted protein could be used as a low fat nutritional supplement.

Example 6

Extraction of Freeze Dried Mussel Powder Using DME and $CO_2$

This example shows that enzyme activity in the defatted mussel solids is retained after extraction of the lipids. Frozen green-lipped mussel slurry was partially defrosted and passed through a dejuicing apparatus, to separate fine solids and liquid (slurry juice) from larger chunks (solids). Part of the slurry was set aside for processing as described in Example 12. The remaining slurry juice and solids were separately freeze-dried, and then extracted first with DME. The resultant crude extracts were then re-extracted with supercritical $CO_2$. Comparative DME extractions were also carried out on slurry that was directly frozen and then freeze-dried (whole powder in Table 1). There was some variability in yields due to the grinding and dewatering steps, which resulted in some enzymatic activity. The lipid yields as percentage by mass of the dry powder, complex lipid contents of the extracts, and EPA and DHA contents of the final products are shown in Table 1.

TABLE 1

Extraction of HUFA containing complex lipids from green-lipped mussels

| Substrate | Total DME yield | Complex lipid yield after $CO_2$ extraction | % EPA, DHA, of complex lipid product |
|---|---|---|---|
| Whole powder | 8.3 | 3.4 | 11.6, 10.8 |
| Slurry solids | 11.9 | 3.8 | 11.9, 10.7 |
| Slurry liquids | 6.4 | Not determined | 20.4, 11.7 |

The phospholipids profile of the extracts is as follows: Phosphatidylcholine 31.9%, Phosphatidylethanolamine 24.5%, Phosphatidylinositol 3.9%, Phosphatidylserine 3.1%, phosphonolipids 1.1%, Ceramide 2-aminoethylphosphonate 17.0%. The Phosphatidylcholine and Phosphatidylethanolamine figures also include plasmalogens.

The phospholipase activity of the mussel powder after lipid removal was determined as follows. Defatted green lipped mussel powder (8 g) solids were mixed with 40 ml of distilled water then centrifuged. An aliquot of supernatant mussel preparation (20 ml) was added to 1 g of a model phospholipids mixture containing ~24% PC, 34% PE and 12% PS and emulsified at 40° C. then held at this temperature for 16 hours. A sample of the reaction mixture (0.2 ml) was analysed for phospholipid composition by $^{31}$P-NMR. The extent of the hydrolysis of phospholipids is shown in Table 2, where L signifies lyso—(one fatty acid hydrolysed from the parent phospholipid), G signifies glycero—(both fatty acids hydrolysed from the parent phospholipid) and tot signifies total intact and hydrolysed phosphoplipid. A large degree of hydrolysis was evident for PC and PE. However, the total hydrolysed plus intact phospholipid profile for the major classes had changed considerably from that of the starting material indicating that other reactions were taking place. Several new unidentified peaks were formed in the $^{31}$P NMR spectrum which may be indicative of products of phospholipase C activity, and could explain this discrepancy.

TABLE 2

Phospholipids hydrolysis using mussel enzyme extract

Phospholipid type and hydrolysis products

| Stream | PC tot | PC | LPC | GPC | PE tot | PE | LPE | GPE | PS tot | PS | LPS |
|---|---|---|---|---|---|---|---|---|---|---|---|
| Feed | 24.0 | 23.5 | 0.5 | | 34.0 | 33.8 | 0.2 | | 12.2 | | |
| Product | 18.3 | 0 | 7.5 | 10.8 | 27.3 | 0 | 16.1 | 11.2 | 7.9 | 7.0 | 0.9 |

Example 7

Extraction of Hoki Heads using DME

This example shows that neutral lipids can be separated from marine-based complex lipids after DME extraction due to the formation of a temporary complex between DME and phospholipids (DME-hydration). Frozen Hoki fish heads were passed through a mincer. The minced heads were then placed on freeze-drier trays, refrozen, and then freeze-dried. The dried, minced heads were then further ground in a knife mill to a powder, and then extracted using DME at 40 bar and 333 K. 1970.6 g of powder was extracted with 15.408 kg of DME using the general method described in Example 4. A brown, liquid lipid-rich extract was obtained, which began to separate into neutral and phospholipids rich phases upon standing. The extract was centrifuged to accelerate the phase separation. The top, neutral lipid phase contained only 2.5% phospholipids. The bottom "gum" phase contained DME-hydrated phospholipids at 19.2% by mass. DME in the bottom phase was then removed under vacuum to give an extract containing 33.2% phospholipids, and 0.5% ganglioside. This complex lipid concentrate contained 5.8% EPA, 12.7% DHA and 3.6% other HUFA.

Example 8

Extraction of Lemon Fish Flesh Using DME

This example shows that complex lipids very rich in HUFA can be extracted from fish flesh. Fresh lemon fish flesh was cut into cubes and then freeze-dried. The dried flesh cubes were then further ground in a knife mill to a powder, and then extracted using DME at 40 bar and 333 K. 135.95 g of powder was extracted with 886.7 g of DME using the general method described in Examples 1 and 2. A yellow, semi-solid extract that was highly enriched in phospholipids (64% by mass) was obtained at a yield of 2.6%. The phospholipids fraction of the extract contained 46.2% PC, 7.9% PI, 3.5% PS, 25.0% PE, 5.2% SM and 7.9% CL. The extract was especially enriched in DHA, which was 24.9% of the total fatty acids. The complex lipid extract also contained 4.5% DPA, 5.3% EPA, and 6.7% AA. The non-denatured fish protein can be used as a food supplement.

Example 9

Extraction of Ovine and Porcine Pancreas with DME, and Re-Extraction of the Lipid Extract with Supercritical $CO_2$ This example shows that supercritical $CO_2$ can be used to re-extract neutral lipids from the crude DME extracts, and that both active phospholipase and proteolytic enzymes can be extracted from the residual solids. Freeze-dried bovine and porcine pancreas samples were extracted using liquid DME at 40 bar and 333 K. 120.72 g of bovine pancreas was extracted with 1193.4 g of DME using the general method described in Examples 1 and 2. A yellow/green, semi-solid extract that was highly enriched in neutral lipids was obtained at a yield of 44.8%. The extract contained only 19% phospholipids, 0.7% AA and 0.7% DPA. 120.18 g of porcine pancreas was extracted with 1240.2 g of DME using the general method described in Examples 1 and 2. A yellow, semi-solid extract that was highly enriched in neutral lipids was obtained at a yield of 24.0%. The extract contained only 13% phospholipids, 1.5% AA and no EPA or DPA. The crude bovine and porcine pancreas extracts were then re-extracted with supercritical $CO_2$ at 300 bar and 333 K until no further neutral lipid was recovered as the extract. The extract and residual complex lipid concentrates were then re-analysed. The bovine complex lipid contained 2.3% AA, 1.4% of EPA and 1.8%

ALA. The porcine complex lipid contained 4.8% AA and less than 1% each of EPA and DPA. The residual defatted ovine and porcine pancreatic solids were then tested for their proteolytic and phospholipase activity.

The phospholipase activity was determined as follows. Defatted bovine (0.65 g) or porcine pancreas (0.98 g) solids were mixed in 20 ml of distilled water then centrifuged. An aliquot of supernatant pancreas preparation (2 ml) was added to an emulsion of a model phospholipids mixture containing ~24% PC, 34% PE and 12% PS (1 g) in water (10 ml) and kept at 40° C. for 16 hours. A sample of the reaction mixture (0.2 ml) was analysed for phospholipid composition by $^{31}$P-NMR. The extent of the hydrolysis is shown in Table 3, where L signifies lyso—(one fatty acid hydrolysed from the parent phospholipid) and G signifies gylcero—(both fatty acids hydrolysed from the parent phospholipid). Porcine pancreas exhibited significant phospholipase A2 activity, with preferential hydrolysis of PE>PS>PC. Bovine pancreas showed much lower phospholipase A2 activity against PE and PC than pig pancreas, but displayed a similar level of hydrolysis of PS.

TABLE 3

Phospholipase A2 activity

| Lipase | Stream | PC | LPC | GPC | PE | LPE | GPE | PS | LPS |
|---|---|---|---|---|---|---|---|---|---|
| Porcine | Feed | 23.5 | | | 33.8 | | | 12.2 | |
| | Product | 16.3 | 6.7 | 0.5 | 11.0 | 16.3 | 0.4 | 6.9 | 5.0 |
| Bovine | Feed | 24.2 | | | 32.6 | | | 12.0 | |
| | Product | 23.0 | 1.2 | 0 | 28.7 | 3.9 | 0 | 7.1 | 4.0 |

The protease activity remaining after DME extraction was determined as follows. DME extracted porcine pancreatic freeze-dried powder (0.9834 g) was extracted with 25 mL of 100 mM CaCl$_2$ (39 mg/mL) and DME extracted bovine pancreas (0.65 g) was extracted with 25 mL of 100 mM CaCl$_2$ (26 mg/mL). The extracts were tested before and after auto activation of enzymes and compared to a standard pancreatic extract prepared from frozen pig and sheep pancreas. The yield is shown in Table 4 for the DME extracted powders, and Table 5 for frozen reference samples.

TABLE 4

Yields of pancreatic proteases from DME extracted freeze dried pancreas powders

| | | Yield comparison | |
|---|---|---|---|
| Enzyme (Substrate) Concentration (mM) | Activation | Pig Yield μmol/min/g | Beef Yield μmol/min/g |
| Trypsin (BApNA) (0.045 mM) | Before | 0.634 | 1.17 |
| | After | 11.6 | 0.33 |
| Elastase I (SAAApNA) (0.25 mM) | Before | 18.9 | 1.9 |
| | After | 67.4 | 0 |
| Chymotrypsin (SAAPFpNA) (0.22 mM) | Before | 254.5 | 1.9 |
| | After | 1265 | 12.3 |
| Chymotrypsin (SFpNA) (0.09 mM) | Before | 0.947 | 1.13 |
| | After | 4.1 | 0.21 |
| Elastase II (MeOSAAPVpNA) (0.5 mM) | Before | 21.4 | 1.17 |
| | After | 44.0 | 1.54 |
| Trypsin (BAEE) (1 mM) | Before | 264.3 Units/g | 489.8 Units/g |
| | After | 1182.7 Units/g | 1884.3 Units/g |
| Chymotrypsin (BTEE) (1 mM) | Before | 403.5 Units/g | 64.0 Units/g |
| Carboxypeptidase B (Hip Arg) (1 mM) | Before | 1177.9 Units/g | 1.87 Units/g |

TABLE 5

Standard protease levels extracted and activated from frozen pig and sheep pancreas

| Enzyme | Substrate | Pig | Sheep | Units |
|---|---|---|---|---|
| Trypsin | BAEE | 168,500 | 93,250 | Units/g of tissue |
| Chymotrypsin | SGGFpNA | 0.48 | 0.675 | μmol/min/g |
| Elastase I | SAAApNA | 0.67 | 0.25 | μmol/min/g |
| Elastase II | SAAPLpNA | 10.8 | 16.825 | μmol/min/g |

Data are based on the extraction of 25 g of ovine and porcine pancreas using standard conditions. Enzyme activities were determined after activation was complete, which was determined by a small decrease in trypsin activity after it had reached its maximal level. The substrate SAAPLpNA used to detect elastase II activity is also hydrolysed by elastase I and chymotrypsin. Therefore elastase II activity was estimated using this substrate.

Extraction of freeze-dried pancreas with DME has resulted in little reduction in the overall protease content of pig pancreas. The lower levels of enzyme activity detected in freeze-dried beef pancreas that was previously extracted with DME can be attributed to species variation and or the age of the animal from which the pancreas was obtained. A considerable level of auto activation was observed in the DME processed powders, as determined by the initial detection of relatively high protease levels prior to proenzyme activation induced by pH adjustment. The initial trypsin activity detected was sufficient to complete activation of the proenzymes upon adjustment of the extracts pH to a value more suitable to activation (e.g. pH 8.5). In contrast, activation of pancreatic proenzymes from frozen pancreas requires the addition of exogenous trypsin.

Comparison of proteolytic profiles obtained from activated frozen pancreas and DME extracted freeze-dried pancreas shows that considerable enzyme activity is retained after DME extraction. Typical extraction efficiency of elastase I from frozen pancreas resulted in a yield of 0.67 µmol/min/g of tissue whereas that obtained from DME extracted freeze-dried pig pancreas resulted in a yield of 67.4 µmol/min/g of tissue. Trypsin yields appear to be lower than expected but this may account for the higher than expected yields of the other protease which are subject to trypsin mediated hydrolysis reducing their activity during extraction from frozen pancreas.

Example 10

Extraction of Hoki Liver with DME

This example shows that lipids containing highly unsaturated fatty acids can be extracted directly from wet biomass. Commercially obtained frozen, whole hoki fish liver was passed though an Urschel grinder with a large whole size, to break the liver up into chunks. The macerated liver was then extracted with DME at 60° C. and 40 bar for 2 hours. 31.996 kg of DME was passed through 6.7427 kg of wet liver. 2.234 kg of extract consisting of water and lipid containing highly unsaturated fatty acids was obtained. The partially extracted residual solids were then remixed and re-extracted with DME at the same conditions, for three hours. 48.46 kg of DME passed through the liver, and a further 1.834 kg of extract was recovered, which was mostly water. In total, 2.3082 kg of oil was obtained after evaporation of water. This oil contained 9.35% DHA, 1.43% DPA, 4.91% EPA, 1.3% C20:4 w-3, 0.6% AA and 1.9% of C18:3 and C18:4 w-3. The residual solids were tested for trans-glutaminase activity, but the enzymes had been deactivated by the extraction process.

Example 11

Extraction of Pine Tree Seed with DME to Obtain Lipids Rich in Non-Methylene Interrupted Fatty Acids This example shows that pine seeds can be extracted with DME to obtain a lipid extract enriched in non-methylene interrupted fatty acids. Commercially available seeds of the pine species Biota Orientalis were partially cold-pressed before extraction with DME. The residual cold pressed seed cake contained approximately 35% by mass neutral oil (26% on a pre-pressed basis). The pressed seed cake was extracted with DME at 60° C. and 40 bar for 150 minutes. 37.06 kg of DME was passed through 14.0385 kg of partially pressed seeds. 5.942 kg of extract was obtained, which was a mixture of neutral lipids, complex lipids and water. The extract was separated into phases by centrifuging. 4.847 kg of neutral lipid oil was isolated as the top phase. This oil contained 9.9% juniperonic acid (C20:4 non methylene interrupted fatty acid), 4.3% sciadonic acid (C20:3 non methylene interrupted fatty acid) and 33.2% alpha linolenic acid. 0.488 kg of an unidentified complex lipid was isolated as the middle phase. This had a similar fatty acid composition to the main lipid product.

Example 12

Extraction of Green-Lipped Mussel Slurry with DME, Followed by Supercritical $CO_2$ Extraction to Separate the Neutral and Complex Lipids This example shows that lipids containing highly unsaturated fatty acids can be extracted from a slurry of animal tissue. The slurry of green-lipped mussel solids produced in Example 6 was extracted without drying. In this case the slurry containing finely divided mussel solids were pumped at high pressure into an extraction vessel, and were co-currently contacted with DME in a vertical static mixer inside the vessel at a pressure of 40 bar and extraction temperature of 60° C. The extracted solids were deposited onto the bottom of the extraction vessel. The DME and dissolved lipids and water left the top of the vessel, and then passed through a pressure reduction valve and heat exchanger that lead to a separation vessel as described in previous examples. 52.906 kg of DME at 333 K and 40 bar was contacted with 6.1359 kg of mussel slurry solution to give 80.4 g of an extract, after removal of water under vacuum, containing complex lipids and neutral lipids rich in HUFA (3.4% C18:3 and C18:4 w-3; 18.7% EPA, 11.1% DHA). The residual solids were freeze-dried to determine the yield of lipid on a dry basis, which was found to be 9.0% by mass. The freeze-dried solids were then ground and re-extracted by the same method as Example 6, but a further yield of only 0.3% by mass was obtained, which shows that extraction from the slurry was almost complete. 49.74 grams of the lipid extract was then re-extracted with supercritical $CO_2$ at 333 K and 300 bar, giving a neutral lipid yield of 29.10 grams (58.4% yield on a total lipid basis). The extract was rich in HUFA (4.0% C18:3 and C18:4 w-3; 20.2% EPA, 11.0% DHA). The residue, which was almost all complex lipid of the types described in Example 6, was also rich in HUFA (2.4% C18:3 and C18:4 w-3; 17.2% EPA, 12.6% DHA).

Example 13

Extraction of Freeze-Dried Krill with Supercritical $CO_2$ Followed by DME, and DME Followed by Re-Extraction with Supercritical $CO_2$ to Separate Neutral Lipids from Complex Lipids Rich in HUFA This example shows that lipids containing highly unsaturated fatty acids can be extracted from freeze-dried krill either by extracting first with $CO_2$ to extract the neutral lipids, and then DME to extract the complex lipids which are rich in HUFA, or by extracting the total lipids from the krill using DME, and then re-extracting the total lipid extract with supercritical $CO_2$ to remove the neutral lipids. 180.12 g of freeze-dried krill powder containing 12.2% lipids was extracted with supercritical $CO_2$ at 300 bar and 314 K to give 11.28 g of lipid. The residual krill powder was then extracted with DME at 40 bar and 332 K to give 3.30 g of lipid enriched in phospholipids that contained 20% EPA, 15.6% DHA, and 38% total HUFA. 3.0603 kg of a second krill powder containing 21.4% lipid was extracted at a pilot scale using 17.271 kg of DME at 40 bar and 357 K to give 652.1 g of a lipid-rich extract, which contained 14.0% EPA and 9.0% DHA of the total fatty acids present. 100.32 g of this lipid-rich extract was then re-extracted using 26.21 kg of supercritical $CO_2$ at 300 bar and 314 K, to give 33.04 g of a non-extracted lipid residue that was highly enriched in phospholipids (76.6%) that contained 28.8% EPA, 21.9% DHA and 55.6% total HUFA.

Example 14

Extraction of Lipids from Wet and Dry *Mortierella Alpina* Biomass Using DME

In this example, the micro-organism *Mortierella alpina* (strain IRL 176) was fermented to produce lipids rich in arachidonic acid. The biomass was then extracted either as wet biomass or as dried material, to give an extract highly enriched in arachidonic acid. A 150 mL roux flask was prepared with 25 mL of potato dextrose agar (PDA). The roux flask was inoculated with 0.1 mL of spore stock and incubated at room temperature for 1 month. The dense spore stock was scraped from the surface of a PDA roux flask and inoculated into a 500 mL unbaffled shake flask with 200 mL of potato dextrose media. The seed shake flask was incubated for 96 hours at 25° C. on a rotary shaker (180 rpm). A 15 mL sample of the seed shake flask was inoculated into 13×500 mL (2000 mL total) unbaffled shake flasks containing 40 g/L glucose and 10 g/L yeast. The production shake flasks were incubated for 7 days at 25° C. on a rotary shaker (180 rpm). The culture was harvested and the biomass was recovered by filtration (filter paper number 1). The recovered cells were washed with 60° C. water at a concentration of 1:1 (vol/vol). The dry cell weight was 12.2 g/L. 218.85 g of the fresh wet biomass was extracted with DME, but only 1.89 g of extract was recovered, that had low levels of lipids. This indicated that the cells were not ruptured. 150.14 g of a second batch of fresh wet biomass was then frozen, and then ground before being extracted with 2.416 kg of DME at 333 K and 40 bar. The freezing and then grinding caused cell rupture, allowing extraction of the oil. A mixture of oil (6.51 g) and water (99.53 g) was extracted. The oil contained 31.8% arachidonic acid, 13.8% GLA, and 55.9% total PUFA. The residual biomass after extraction (37.34 g) was then dried overnight in a forced convection oven at 313 K to give a final dry mass of 30.02 g. This dry biomass was then ground with a mortar and pestle. 27.61 g of this dry biomass was then extracted with 0.840 kg of DME at 333 K and 40 bar, to recover a further 3.87 g of lipid that contained 33.2% arachidonic acid, 14.1% GLA, and 57.3% total PUFA.

Example 15

Extraction of Highly Unsaturated Algal Lipids Using DME 58.29 g of wet biomass produced in mixotrophic and heterotrophic fermentations of *Nitzschia Laevis* was frozen and then extracted with 1584 grams of DME at 40 bar and 333 K. 53.10 g of total extract was obtained, which consisted of 43.55 g of water, and 9.55 gram of neutral and complex lipid that had 2.2% AA, 11.8% EPA and 2.8% DHA. The lipid mixture was separated from the water by evaporation under vacuum. 2.161 g of the dry lipid mixture was extracted using 108 g of supercritical $CO_2$ at 300 bar and 333 K, to yield 0.560 g of neutral lipid that contained only 1.4% AA, 8.2% EPA, and 2.2% DHA. The residual complex lipid material after extraction contained 4.2% AA, 20.0% EPA, and 3.4% DHA.

Industrial Applicability

The process of the invention is useful for extracting highly unsaturated lipids (fatty acids) from materials, such as dried or partially dried plants or seeds (including marine or terrestrial species), or animal products (including marine or terrestrial species or micro-organisms). Highly unsaturated lipids are essential in the development of the brain and eyesight for infants, and may also be beneficial for cardiovascular health, mental health, and immune and inflammatory conditions.

The invention claimed is:

1. A process for obtaining complex lipids containing highly unsaturated fatty acids from a plant material that contains highly unsaturated fatty acids or from an animal material that contains highly unsaturated fatty acids, wherein the animal material is selected from animal glands, bacteria, shellfish, marine invertebrates, animal organs, fish heads, fish organs and fish eggs, the process comprising:
    (i) contacting the the plant material that contains highly unsaturated fatty acids, or the animal material that contains highly unsaturated fatty acids, wherein the animal material is selected from animal glands, bacteria, shellfish, marine invertebrates, animal organs, fish heads, fish organs and fish eggs, with liquid dimethyl ether to form (a) a dimethyl ether solution containing complex lipids, wherein said lipids comprise highly unsaturated fatty acids, and (b) a residue of the plant material or of the animal material;
    (ii) separating the solution from the residue of the plant material or of the animal material; and
    (iii) recovering complex lipids, under subcritical pressure, from the dimethyl ether solution, wherein said complex lipids comprise highly unsaturated fatty acids;
    wherein each highly unsaturated fatty acid is a fatty acid having 3 or more sites of unsaturation and 18 or more carbon atoms in the fatty acid chain; and
    wherein complex lipid is a lipid comprising at least one each of (a) at least one fatty acid; (b) at least one of a polar phosphorous group, an amino alcohol and a carbohydrate; and (c) glycerol.

2. The process of claim 1 wherein the solution formed by the step of contacting in step (i) comprises neutral lipids and complex lipids.

3. The process of claim 2 wherein the neutral lipids are recovered from the solution together with the complex lipids.

4. The process of claim 3 further comprising separating the neutral lipids from the complex lipids.

5. The process of claim 2 wherein a gum phase comprising the complex lipids and dissolved dimethyl ether forms during the step (iii) of recovering the lipids.

6. The process of claim 5 further comprising separating the gum phase containing complex lipids from the solution containing neutral lipids.

7. The process of claim 6 wherein the neutral lipids are separated from the complex lipids by at least one of phase separation and centrifugation.

8. The process of claim 7 wherein the solution is heated prior to centrifugation.

9. The process of claim 5 wherein the gum phase comprising complex lipids is dried by vacuum drying.

10. The process of claim 2 further comprising treating the lipids recovered from the solution in step (iii) with near-critical $CO_2$ according to the following steps:
    (iv) contacting the lipids recovered from the solution in step (iii) with near-critical $CO_2$ to give a $CO_2$ solution containing neutral lipids and a residue of complex lipids;
    (v) separating the $CO_2$ solution containing neutral lipids from the residue of complex lipids; and
    (vi) recovering the neutral lipids from the $CO_2$ solution.

11. The process of claim 1 which comprises, prior to contacting according to step (i), the steps of:

a. contacting the plant material or the animal material with near-critical $CO_2$ to give a $CO_2$ solution containing neutral lipids and a residue of the plant material or of the animal material;
b. separating the $CO_2$ solution from the residue of the plant material or of the animal material; and
c. recovering the neutral lipids from the $CO_2$ solution.

12. The process of claim 1 wherein the plant material or the animal material is dried or partially dried before use.

13. The process of claim 11 wherein the plant material or the animal material is dried to less than 30% by weight of water in the material.

14. The process of claim 12 wherein the plant material or the animal material is dried to not less than 5% by weight of water in the material.

15. The process of claim 11 wherein the plant material or the animal material is dried by freeze drying or by spray drying.

16. The process of claim 1 wherein the plant material or the animal material comprises wet biomass that has been frozen.

17. The process of claim 16 wherein the frozen wet biomass is ground prior to step (i).

18. The process of claim 2 wherein the complex lipids comprise one or more lipid selected from the group consisting of phospholipids, gangliosides, glycolipids, cerebrosides and sphingolipids.

19. The process of claim 18 wherein one or more of the complex lipids is a phospholipid.

20. The process of claim 19 wherein the phospholipid is selected from the group consisting of phosphatidyl choline, phosphatidyl serine, phosphatidyl ethanolamine, sphingomyelin, cardiolipin, a plasmalogen, an alkylacylphospholipid, a phosphonolipid, a lysophospholipid, ceramide aminoethylphosphonate and phosphatidic acid.

21. The process of claim 18 wherein the glycolipids comprise one or more glycolipids selected from the group consisting of galactolipids, gangliosides, sulphoquinovosyldiacylglycerides, tauroglycolipids, glycosphingophospholipids and mannosyl lipids.

22. The process claim 1 wherein the highly unsaturated fatty acids contained in the lipids comprise one or more highly unsaturated fatty acids selected from the group consisting of arachidonic acid, alpha- and gamma-linolenic acid, pinolenic acid, sciadonic acid, columbinic acid, dihomolinolenic acid, eicosatetraenoic acid, juniperonic acid, stearidonic acid, eicosapentaenoic acid, docosapentaenoic acid and docosahexaenoic acid.

23. The process of claim 1 wherein the plant material is obtained from any one of the group consisting of marine macro- and micro-algae, filamentous fungi, yeast, plant seeds, plant leaves, plant needles, fern fronds, moss and lichen.

24. The process of claim 1 wherein the liquid dimethyl ether is near-critical dimethyl ether.

* * * * *

UNITED STATES PATENT AND TRADEMARK OFFICE
CERTIFICATE OF CORRECTION

PATENT NO.        : 8,383,845 B2
APPLICATION NO.   : 12/301729
DATED             : February 26, 2013
INVENTOR(S)       : Owen John Catchpole et al.

Page 1 of 1

It is certified that error appears in the above-identified patent and that said Letters Patent is hereby corrected as shown below:

In the Claims

Column 20, Line 15:
"(i) contacting the the plant material that contains highly" should read, --(i) contacting the plant material that contains highly--.

Column 20, Line 33:
"wherein complex lipid is a lipid comprising at least one" should read, --wherein each complex lipid is a lipid comprising at least one--.

Signed and Sealed this
Twenty-eighth Day of January, 2014

Michelle K. Lee
*Deputy Director of the United States Patent and Trademark Office*